(12) United States Patent
Whitney

(10) Patent No.: US 6,938,659 B2
(45) Date of Patent: Sep. 6, 2005

(54) RUNFLAT TIRE HAVING CROWN-REINFORCING INSERT EXTENDING INTO THE SIDEWALLS

(75) Inventor: Thomas Wood Whitney, Grand Island, NY (US)

(73) Assignee: The Goodyear Tire & Rubber Company, Akron, OH (US)

( * ) Notice: Subject to any disclaimer, the term of this patent is extended or adjusted under 35 U.S.C. 154(b) by 334 days.

(21) Appl. No.: 10/247,646

(22) Filed: Sep. 19, 2002

(65) Prior Publication Data

US 2004/0055687 A1 Mar. 25, 2004

(51) Int. Cl.⁷ .......................... B60C 9/18; B60C 15/00; B60C 17/00
(52) U.S. Cl. .................. 152/526; 152/532; 152/538; 152/539; 152/541; 152/546; 152/555; 152/517
(58) Field of Search .................. 152/389, 541, 152/546, 526, 532, 538, 549, 555, 517

(56) References Cited

U.S. PATENT DOCUMENTS

| | | | | |
|---|---|---|---|---|
| 2,979,100 A | * | 4/1961 | Woodall ...................... | 152/549 |
| 3,911,987 A | | 10/1975 | Takusagawa et al. | |
| 3,935,892 A | * | 2/1976 | Arimura et al. ............ | 152/517 |
| 3,982,579 A | * | 9/1976 | Mirtain .................... | 152/209.8 |
| 4,176,703 A | * | 12/1979 | Nojima et al. ......... | 152/209.12 |
| 4,203,481 A | | 5/1980 | Ranik, Jr. | |
| 4,265,288 A | | 5/1981 | Kaneko et al. | |
| 4,640,329 A | * | 2/1987 | Nakasaki et al. ...... | 152/209.11 |
| 4,773,463 A | * | 9/1988 | Okuni et al. ................ | 152/546 |
| 4,962,802 A | * | 10/1990 | Rohde ........................ | 152/532 |
| 5,368,082 A | | 11/1994 | Oare et al. | |
| 5,427,166 A | | 6/1995 | Willard, Jr. | |
| 5,511,599 A | | 4/1996 | Willard, Jr. | |
| 5,526,863 A | * | 6/1996 | Hodges ...................... | 152/541 |
| 5,769,980 A | * | 6/1998 | Spragg et al. .............. | 152/517 |
| 6,338,374 B1 | | 1/2002 | Nguyen et al. | |
| 6,533,011 B2 | * | 3/2003 | Tobino et al. .............. | 152/454 |

FOREIGN PATENT DOCUMENTS

| | | | |
|---|---|---|---|
| EP | 0385192 | | 9/1990 |
| EP | 0844110 | * | 5/1998 |
| GB | 2033312 | * | 5/1980 |
| GB | 2087805 | | 6/1982 |
| JP | 04176705 | * | 6/1992 |
| JP | 06-115309 | * | 4/1994 |
| JP | 0928704 | | 7/1999 |
| JP | 2000-108617 | * | 4/2000 |

* cited by examiner

*Primary Examiner*—Jeff H. Aftergut
*Assistant Examiner*—Justin Fischer
(74) *Attorney, Agent, or Firm*—Howard M. Cohn

(57) ABSTRACT

A pneumatic tire has a crown-reinforcing insert which extends from under the tread substantially, such as at least one-third of the sidewall height, into the sidewall of the tire. Apexes extend from the beads substantially, such as at least one-third of the sidewall height, into the sidewall of the tire, thereby effecting a substantial, such as at least one-third of the sidewall height, "overlap" between end portions of the crown-reinforcing insert and the apexes. Additionally, at least one belt extends from under the tread substantially into the sidewall, and the turn-ups of at least some of the plies extend quite high, such as at least one-third of the sidewall height, into the sidewall. This combination of features yields superior runflat performance.

14 Claims, 1 Drawing Sheet

RUNFLAT TIRE HAVING CROWN-REINFORCING INSERT EXTENDING INTO THE SIDEWALLS

TECHNICAL FIELD OF THE INVENTION

This invention relates to pneumatic tires and, more particularly, to runflat tires and, more particularly, to runflat motorcycle tires.

BACKGROUND OF THE INVENTION

Various methods have been devised for enabling the safe continued operation of un-pressurized or under pressurized vehicle tires with the intent of minimizing further damage to the uninflated tire and without compromising vehicle handling while driving to where the tire can be changed. Loss of tire pressure can result from a variety of causes, including puncture by a foreign object such as a nail. Pneumatic tires designed for sustained operation when "uninflated" ("flat") or under inflated are also called "runflat" tires, as they are capable of being driven in the "flat" condition. They are also called extended mobility technology tires, or "EMT" tires. A conventional pneumatic tire will collapse upon itself when it is uninflated and carrying the weight of a vehicle. The tire's sidewalls buckle outward in the circumferential portion of the tire where the tread contacts the ground, making the tire "flat."

The term "runflat" is generally used to describe a tire that is designed such that the tire structure alone, and in particular the structure of the sidewalls, has sufficient strength and rigidity to support the vehicle load when the tire is operated without being inflated. The sidewalls and internal surfaces of such runflat tires or EMT tires do not collapse or buckle due to their rigidity, and the prevailing designs of such tires do not otherwise contain or use other supporting structures or devices to prevent the tire from collapsing. Examples of such other supporting structures are devices that might be contained within the tire and which experience no loading during normal inflated operation.

In general, runflat tires or EMT tires incorporate sidewalls that are thicker and/or stiffer so that the tire's load can be carried by an uninflated tire with minimum adverse effects upon the tire itself and upon vehicle handling until such reasonable time as the tire can be repaired or replaced. The typical methods used in sidewall thickening and stiffening include the incorporation of circumferentially disposed wedge inserts in the inner peripheral surface of the sidewall portion of the carcass, which is the region in the tire usually having the lowest resistance to deformation under vertical loading. In such runflat tire designs, each sidewall is thickened in the region between the bead and the tread shoulder. The wedge inserts in each sidewall are generally crescent-shaped in cross-sectional view, in order to conform to the shape of the sidewalls. Such wedge reinforced sidewalls, when operated in the uninflated condition, experience a net compressive load in the region of the sidewall that is closest to the road-contacting portion of the tread. More specifically, the bending stresses on the sidewalls are such that the axially outwardmost portions of the reinforced sidewalls experience tensile stresses while the axially inward portions experience compressive stresses during runflat operation.

A Goodyear patent, U.S. Pat. No. 5,368,082 ('082), by Oare et al, discloses a low aspect ratio runflat pneumatic radial ply tire which employs multiple wedge inserts in each sidewall to improve runflat stiffness. Approximately six additional pounds of weight per tire was required to support an 800 lb. load in this uninflated tire. This earlier invention, although superior to prior attempts at runflat tire design, still imposed a weight penalty which could, however, be partially offset by the elimination of a spare tire and the tire jack. However, this weight penalty becomes even more problematic in the design of tires having higher aspect ratios. The '082 patent teaches a sidewall construction for runflat tires in which the tire is constructed with two plies, an inner liner and two reinforcing wedge inserts in each sidewall. The two inserts in each sidewall are disposed such that one insert is located between the two plies while the other insert is located between the inner liner and the first or innermost ply.

Two U.S. Pat. Nos. 5,427,166 and 5,511,599 of Walter L. Willard, Jr., show Michelin tires that incorporate an additional third ply and a third insert in the sidewall to further increase the runflat performance of the tire over that of the '082 patent. These Willard patents discuss some of the load relationships that occur in the uninflated condition of the tire and demonstrate that the concept taught in the '082 patent can be applied to additional numbers of plies as well as additional wedge inserts in each sidewall.

However, such large amounts of rubber used to stiffen the sidewall members become factors in flexure heating that leads to tire failure during runflat operation. This is especially so when the tire is operated at high speeds during low or zero inflation. Therefore, one goal of runflat tire design is to minimize the number of wedge inserts used to stiffen each sidewall and the total amount of wedge insert material used in runflat tire.

While the high resistance to compression and deflection of the inserts provides the necessary resistance to the collapse of the uninflated loaded tire, the use of multiple plies and more than one reinforcing wedge insert in each sidewall has drawbacks which include the above mentioned increase in tire weight and flexure-induced heat buildup. Such designs also increase the tire's complexity in ways that adversely affect manufacturing and quality control.

Although many of the run-flat tire constructions set forth in the above-referenced patents have proven to be successful for certain applications, these constructions are usually found in low profile tires, that is, applications in which the tires have an aspect ratio of not more than 50%. These tires are of the type usually found on high performance vehicles. It is somewhat more difficult to implement run-flat tire constructions for higher profile tires, that is tires having an aspect ratio of greater than 50%, so that the tires have both sufficient uninflated durability and good subjective ride performance in the inflated condition.

The following patents are also noted as being of interest.

U.S. Pat. No. 3,911,987 (Takusagawa, et al.) discloses a pneumatic safety tire for motorcycles which includes a pair of elastic reinforcing layers disposed along the carcass plies of the tire and extending from proximal the tire beads to a tire inner surface under the tread rubber. The Shore A hardness of the reinforcing layer is 45 or more, so that the safety tire can run at a high speed even after puncture, while providing excellent handling characteristics under normal conditions.

U.S. Pat. No. 4,203,481 (Ranik, Jr.) discloses a pneumatic tire, rim, and a combination thereof that yields improved stability characteristics when the tire is run flat. The tire has an asymmetric sidewall construction resulting from the inclusion of rubber inserts in its sidewalls of different bulk (thickness) than one another, and the rim has axially outward extending rim flange extensions which are angled in relation to the axis of rotation of the rim. The rubber inserts (13, 14)

are located inwardly of the carcass reinforcing material or plies of the tire. The inserts are generally crescent-shaped, and are located at the midpoint of the sidewall; that is, the distance half way between the bead seat and the road engaging tread surface when the tire is mounted and inflated under normal conditions. The inserts are located inside the reinforcing body ply. The inserts in the vehicle side are 0.25 inches (0.63 cm) thick on one side of the tire and 0.20 inches (0.51 cm) thick on the other side of the tire. The modulus of the rubber compound utilized in the inserts is 1300 psi at 200% elongation.

U.S. Pat. No. 4,265,288 (Kaneko, et al.) discloses a pneumatic safety tire having annular rubber reinforcements (sidewall inserts) having crescent sectional shape and applied to a tire carcass at tire sidewalls, the rubber of the reinforcements having a JIS hardness of not less than 70, a tensile stress ($Mod_{25}$) after an aging test of not less than 10 $kg/cm^2$, and a repulsive elasticity by Dunlop tripsometer of not less than 65%.

U.S. Pat. No. 5,769,980 (Spragg, et al.) discloses a pneumatic passenger tire having an aspect ratio of greater than 50% and having crescent-shaped sidewall inserts.

U.K. Patent Application No. GB 2,087,805 discloses a pneumatic safety tire having at least two carcass ply structures (38,40), and disposed adjacent the radially inner surface of each ply structure (38,40) there is an annular elastomeric insert (42,46). One insert (42) extends from the bead region radially outward, terminating beneath the tread reinforcing belt structure (36), preferably a distance from the tread edge a distance A of at least ten percent (10%) and not greater than forty percent (40%) of the tread width, such as approximately 25% of the tread width. The other insert (46) is disposed between reinforcing ply structures (38,40), and extends from the bead region radially outward, terminating beneath the tread reinforcing belt structure (36) in the same manner as the one insert (42). The elastomeric inserts (42) each have a thickness (B), a the maximum section diameter of the tire of at least one percent (1%), preferably at least 3% and not greater than 5% of the maximum section diameter of the tire. (The maximum section diameter of the tire is measured parallel to the rotational axis of the tire from the axially outer surfaces of the tire, exclusive of indicia, adornment and the like.) Each elastomeric insert (46) has a thickness C of at least one percent (1%), preferably in the range of 2–4%, and not greater than 5%, of the maximum section diameter of the tire.

Clearly, the goal in runflat tire design is to provide a low-cost, light-weight tire that gives both good runflat vehicle handling as well as good service life during runflat operation, while providing excellent handling characteristics under normal operating conditions.

SUMMARY OF THE INVENTION

According to the invention, a pneumatic tire comprising an elastomer crown-reinforcing insert disposed in a tread region of the tire and extending at least 33%, such as 50% of a sidewall height into sidewalls of the tire. Apexes extend from the beads of the tire at least one-third of the sidewall height, into the sidewalls of the tire, and there is preferably a radial overlap between end portions of the crown-reinforcing insert and the apexes. At least one belt extends from the tread region into the sidewalls, and turn-up portions of at least some of a plurality of plies extending at least one-third of the sidewall height, into the sidewall.

According to an aspect of the invention, the tire has at least two belts, a first belt and a second belt, wherein the second belt is disposed radially outward from the first belt, and it is the first belt which extends beyond the tread region into the sidewall.

According to an aspect of the invention, the tire has at least three reinforcing plies, a first ply, a second ply, and a third ply, wherein the second ply is radially outward from the first ply and the third ply is radially outward from the second ply, and each of the reinforcing plies has a turn-up which extends into the sidewall of the tire. In an embodiment of the invention, the crown-reinforcing insert is disposed between the second ply and the third ply. It is within the scope of the invention that, with very low profile tires, the number of plies may be reduced, in which case the crown-reinforcing insert would be place between the first and second plies.

According to an aspect of the invention, the crown-reinforcing insert is formed of elastomer having a Shore A hardness of at least 60.

Benefits and advantages of the invention will become apparent to those skilled in the art to which it pertains upon a reading and understanding of the following detailed specification.

BRIEF DESCRIPTION OF THE DRAWINGS

The structure, operation, and advantages of the invention will become further apparent upon consideration of the following description taken in conjunction with the accompanying drawings, wherein.

DEFINITIONS

Figure 1:
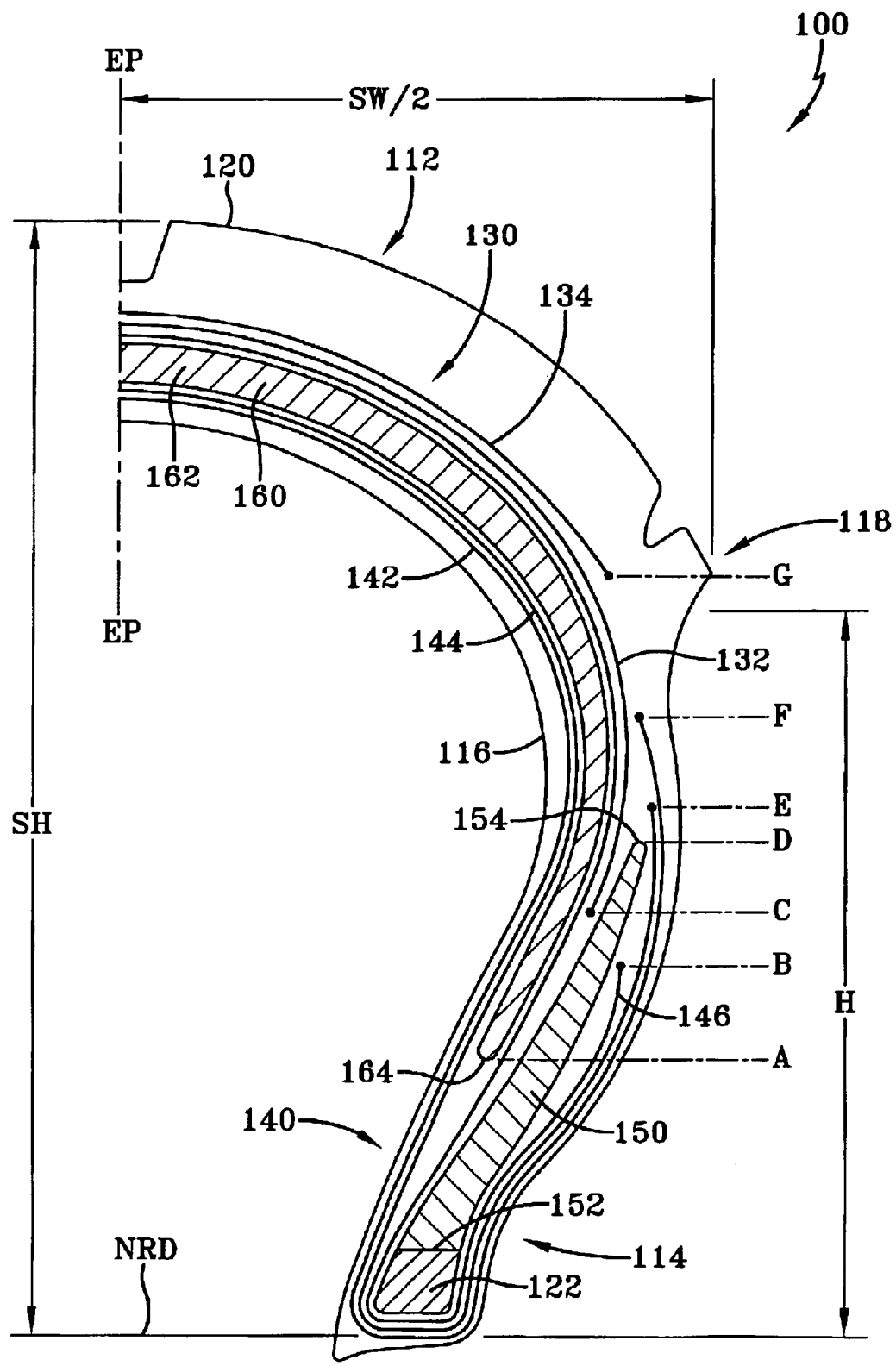
FIG. 1 is a meridional cross-sectional view of an embodiment of the tire of the present invention. It should be understood that only a relevant and illustrative portion of the tire is shown, another "half" of the tire being a mirror image of what is shown.

"Apex" means an elastomeric filler located radially above the bead core and between the plies and the turn-up ends of the plies. The apex is sometimes referred to as a "bead filler".

"Aspect Ratio" (AR) means the ratio of the section height (SH) of a tire to its section width (SW). This term is also used to refer to the cross-sectional profile of the tire. A low-profile tire, for example, has a low aspect ratio.

"Axial" and "Axially" means the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from 18° to 30° relative to the equatorial plane (EP) of the tire.

"Bias ply tire" means a belted or circumferentially-restricted pneumatic tire in which at least one ply has cords which extend from bead to bead are laid at cord angles less than 65 degrees, typically 15–40 degrees, with respect to the equatorial plane (EP) of the tire. (Compare "Radial ply tire".)

"Carcass" means the tire structure apart from the belt structure, tread, and undertread over the plies, but including the beads.

"Circumferential" most often means circular lines or directions extending along the perimeter of the surface of the annular tread of the tire, perpendicular to the axial direction. It can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire crown" means the tread, tread shoulders and adjacent portions of the sidewalls.

"Equatorial Plane" (EP) means the plane perpendicular to the tire's axis of rotation and passing through the center of its tread, or the plane containing the circumferential centerline of the tread.

"EMT tire" means "extended mobility technology tire," and can be used interchangeably with "runflat tire."

"Inner liner" means the layer or layers of elastomer or other material that form the inside surface of a tubeless tire and that contain the inflating fluid (e.g., air) within the tire.

"Lateral" means a direction parallel to the axial direction.

"Meridional" refers to a direction parallel to the axial direction but, more specifically, to a laterally disposed curved line that lies in a plane that includes the axis of the tire.

"NRD" means nominal rim diameter, which is substantially equal to the diameter of the tire at the inner surface of the bead region. It is the outside diameter of a rim upon which the tire is intended to be mounted.

"Ply" means a cord-reinforced layer of rubber-coated radially deployed, parallel cords.

"Radial" and "radially" mean directions radially toward or away from the axis of rotation of the tire.

"Radial ply structure" means the one or more carcass plies or which at least one ply has reinforcing cords oriented at an angle of between 65 and 90 degrees with respect to the equatorial plane (EP) of the tire.

"Radial ply tire" means a belted or circumferentially-restricted pneumatic tire in which at least one ply has cords which extend from bead to bead are laid at cord angles between 65 and 90 degrees with respect to the equatorial plane (EP) of the tire.

"Runflat" or "runflat tire" is a pneumatic tire that is designed to provide limited service while uninflated or underinflated.

"Section height" (SH) means the radial distance from the nominal rim diameter (NRD) to the outer diameter of the tire at its equatorial plane (EP).

"Section width" (SW) means the maximum linear distance parallel to the axis of the tire and between the exterior of its sidewalls when and after the tire has been inflated at normal pressure for 24 hours, but unloaded, excluding elevations of the sidewalls due to labeling, decoration or protective bands.

"Shoulder" means the upper portion of sidewall just below the lateral edge of the tread.

"Tread" means the ground-contacting portion of the tire.

"Turn-up" or "turn-up end" means the end portion of a carcass reinforcing ply that extends radially outward, beyond the bead core around which the ply is wrapped (typically 180 degrees).

"Sidewall" means that portion of a tire between the tread region and the and the bead region.

DETAILED DESCRIPTION OF THE INVENTION

FIG. 1 is illustrative of a tire 100 having a tread region 112, two bead regions 114 (only one of which is shown) and two sidewalls 116 (only one of which is shown). Each sidewall extends between a respective one of the bead regions 114 and the tread region 112. The tread region 112 comprises a tread 120. The bead region 114 comprises a bead (or bead bundle) 122. A shoulder 118 of the tire is defined as the upper portion of sidewall 116 just below the lateral edge of the tread 120. A belt structure, or belt package 130 is disposed in the tread region 112, below the tread 120. A number of reinforcing plies 140 are disposed below the belt structure 130 and extend laterally beyond the lateral edges of the tread, radially in the sidewall to the bead(s) 122, wrap approximately 180 degrees around the beads, and extend radially back up into the sidewall 116. The portion(s) of the ply/plies 140 extending back up into the sidewall 116 is called the "turn-up". The tire carcass is defined as the tire structure apart from the belt structure 130, tread 120, and undertread (if any, not shown) over the ply/plies 140, but including the beads 122 and an inner liner (not shown) is disposed on the inner surface of the tire carcass. A crown of the tire 100 is defined as the tread 120, tread shoulders 118 and adjacent portions of the sidewalls 116. The tire 100 has a section height (SH) which is defined as the radial distance from the nominal rim diameter (NRD), or inner periphery of the tire 100 in the bead region 114, to the outer diameter of the tire (namely the tire tread 120) at its equatorial plane (EP). The tire 100 has a section width (SW) which is defined as the maximum linear distance parallel to the axis of the tire and between the exterior of its sidewalls 116 when and after the tire has been inflated at normal pressure for 24 hours, but unloaded, excluding elevations of the sidewalls due to labeling, decoration or protective bands. Since FIG. 1 shows only half of the tire, the width as illustrated is half the section width (SW/2). The tire has an aspect ratio (AR) which is defined as the ratio of the section height (SH) of the tire to its section width (SW). The sidewall 116 has a height (H), which is defined as the radial distance from the NRD to the shoulder 118 of the tire 100. This is conventional tire design and terminology.

The belt package 130 comprises at least two belts—a first belt 132 and a second belt 134. The second belt 134 is disposed radially outward from the first belt 132. The belts 132, 134 both extend laterally across the tread region 112, and circumferentially around the tire, in a conventional manner. Each belt 132, 134 has lateral edges.

The inner, or first belt 132 extends laterally across the tread region 112 and beyond the is tread region 112 into the sidewall 116, its lateral edge being disposed at point which is a radial distance C from the NRD of the tire 100. The outer, or second belt 134 extends laterally approximately completely across the tread region 112, to approximately the shoulder 118 of the tire 100, its lateral edge being disposed at point which is a radial distance G from the NRD of the tire.

The belts 132, 134 are preferably aramid belts, comprising reinforcing cords disposed at an angle in the range of between 0 and 45 degrees, preferably between 26–30 degrees, as measured with respect to the EP of the tire. The belts may also be formed of fiberglass with cords disposed at angles in the same range. The cords of one belt may be disposed at an angle which is different than, including opposite to those of the other belt.

An important aspect of the invention is that at least one of the belts 132, 134 extends into the sidewall(s) of the tire. In FIG. 1, the inner/first belt 132 is shown extending into the sidewall 116 of the tire 100. It is within the scope of the invention that both belts 132, 134 can extend into the sidewalls 116 of the tire 100, to the same or different distances than one another. It is within the scope of the invention that a one of the belts extends into a one of the sidewalls of the tire, while the other of the belts extends into the other sidewall of the tire, which would result in an asymmetrical tire construction. There can, of course, be three or more belts, although only two are discussed with respect to the illustrated embodiment of the invention.

The tire 100 has at least three reinforcing, or carcass plies—a first ply 142, a second ply 144, and a third ply 146. (The labels "first", "second" and "third" are indicative of the order in which the plies would typically be laid up, sequentially, upon a tire build drum.) The second ply 144 is radially outward from the first ply 142. The third ply 146 is radially outward from the second ply 144. The plies 142, 144, 146 all extend from one bead 122, through the sidewall 116, across the tread region 112, through the other sidewall (not shown) to the other bead (not shown) of the tire, in a conventional manner. Each ply has two end portions, called "turn-ups", which are those portions of the ply which extend beyond the bead, back into the sidewall of the tire, in a conventional manner.

The turn-up of the first ply 142 extends beyond the bead 122 into the sidewall 116, its end being disposed at point which is a radial distance F from the NRD of the tire. The turn-up of the second ply 144 extends beyond the bead 122 into the sidewall 116, its end being disposed at point which is a radial distance E from the NRD of the tire. The turn-up of the third ply 146 extends beyond the bead 122 into the sidewall 116, its end being disposed at point which is a radial distance B from the NRD of the tire.

An important aspect of the invention is that the plies 142, 144, 146 all have relatively "high" turn-up ends, which means that after wrapping (typically approximately 180 degrees) around the bead, the turn-up end portion of the ply extends substantially, such as at least H/3 (one-third (33%) of the height of the sidewall) into the sidewall 116 towards the tread region 112.

As shown in FIG. 1, the turn-ups extend progressively further into the sidewall of the tire, from the third ply 146 which is outermost with respect to the tire carcass (and closest to the bead 122) to the first ply 142 which is innermost with respect to the tire carcass (and furthest from the bead bundle). In "numerical" terms, F>E>B. It is within the scope of the invention that two or more of the plies extend the same distance into the sidewall (e.g., F=E, or E=B). It is within the scope of the invention that the progression of how far the turn-ups extend into the sidewalls is in the reverse order from what is shown (i.e., F<E<B). Other "combinations" are also possible (e.g., F>E and B>E, with F either equal to or not equal to B).

The plies 142, 144, 146 are preferably rayon plies, comprising cords disposed at an angle in the range of between 15 and 40 degrees, preferably 26–30 degrees for bias ply constructions, or between 65 and 90 degrees, preferably 70–85 degrees for radial ply constructions as measured with respect to the EP of the tire. The plies may also be formed of nylon, with cords disposed at angles in the same range. The cords of one ply may be disposed at an angle which is different than, including opposite to those of the other plies.

The bead 122 is preferably formed as heavy-duty, 5-strand bead construction. This is merely exemplary, and the number of wires is not critical. The bead is preferably stronger than that of a conventional motorcycle tire. The bundle width and diameter should be such that it provides a very tight fit in the bead seating region of the wheel. Pressure required to seat the beads may be higher than normal (e.g., >40 psi).

As shown in FIG. 1, the plies 142, 144, and 146 are arranged in a conventional manner in that they wrap around the bead, from inside the bead to outside the bead. It is within the scope of the invention that the plies could wrap from outside the bead to inside the bead, in which case the turn-ups would be on the inside, rather than on the outside of the respective ply.

An apex 150 is disposed atop the bead 122. The apex 150 is formed of high-modulus elastomer and extends into the sidewall 116 towards the tread region 112. The apex is generally triangular in cross-section, and has a base 152 adjacent (proximal) the bead 122, and a tip 154 which is distal from the bead 122 at a point which is a radial distance D from the NRD of the tire. The apex 150 tapers in thickness from widest at its base 152, where its width is substantially equal to the cross-dimension of the bead 122, to narrowest at its tip, where its width is substantially zero.

Apexes, per se, are common in tire construction, and they serve to separate the turn-ups from the plies themselves. The apex 150 is a standard hard structural apex. It serves the purpose of a lower sidewall EMT insert. Generally, apexes can also be used to modify the handling characteristics of a tire, e.g. to improve the steering response.

An important aspect of the invention is that the apex 150 is "tall" in that it extends quite far into the sidewall 116 towards the tread region 112, substantially, such as at least H/3 (one-third of the height of the sidewall) into the sidewall 116 towards the tread region 112.

As illustrated, the turn-up of the ply 146 extends nearly to the tip 154 of the apex 150 (B<D), the turn-up of the ply 144 extends slightly beyond the tip 154 of the apex 150 (E>D), and the turn-up of the ply 142 extends farther beyond the tip 154 of the apex 150 (F>E>D)

A suitable material for the apex 150 is an elastomer, having the following material properties/characteristics:

modulus=Approximately (e.g., +/−10%) 1735 psi at 200% elongation

Shore A hardness=approximately 90

Tensile stress after an aging test of 48 hrs. @100° C.=1815 psi

A crown-reinforcing (C-R) insert 160 is disposed below the belt structure 130. The crown-reinforcing insert 160 is formed of elastomer and extends, preferably continuously, across the tread region 112, through the shoulder 118, into the sidewall 116 of the tire. The crown-reinforcing (C-R) insert 160 has a central portion 162 which is substantially at the EP of the tire 100, and lateral edges (tips) 164 (one shown) which is located in the sidewall 116 of the tire 100. The crown-reinforcing (C-R) insert 160 tapers in thickness from thickest in its central portion 162 to thinnest at its lateral edge (tip) 164. The lateral edge (tip) 164 of the crown-reinforcing insert 160 extends to a point which is a radial distance A from the NRD of the tire. From another perspective, it can be seen that the crown-reinforcing (C-R) insert 160 extends a percentage of the sidewall height (H), preferably at least 33% (one-third) of the sidewall height (H) in to the sidewall 116 of the tire 100.

In FIG. 1, the crown-reinforcing (C-R) insert 160 is shown as being disposed between the ply 144 and the ply 146. In FIG. 1, it is illustrated that the crown-reinforcing (C-R) insert 160 extends at least 50% of the sidewall height (H) in to the sidewall 116 of the tire 100.

The crown-reinforcing (C-R) insert may also extend discontinuously (with one or more gaps, or discontinuities) across the tread region 112, but some loss in runflat (e.g., 0 psi) handling would likely result from such interruptions in its structural integrity. The major purpose of the crown-reinforcing (C-R) insert is to stiffen the tread and upper sidewall region. Motorcycle tires depend largely on their crown profile to provide lateral (or turning) forces. Without the crown-reinforcing (C-R) insert, the runflat handling of a motorcycle tire would be extremely sluggish. Preferably, the thickness of the crown-reinforcing (C-R) insert may be thinner at the crown, to reduce heat build-up and allow speed rated tires.

An important aspect of the invention is that the crown-reinforcing (C-R) insert 160 extends quite far into the sidewall 116 towards the bead region 114, substantially, such as at least H/3 (one-third (33%) the height of the sidewall) into the sidewall 116 towards the bead region 114. As enumerated below, in a case that the radial distance A is 35% of the sidewall height (H), then the crown-reinforcing (C-R) insert 160 extends 65% (100%–35%) into the sidewall 116 towards the bead region 114.

A suitable material for the crown-reinforcing insert 160 is an elastomer, having the following material properties/characteristics after vulcanization:

Modulus=Approximately 1150 psi @200% elongation

Shore A hardness=Approximately 75

Tensile stress after an aging test of 48 hrs. @100° C.=Approximately 1580 psi.

As mentioned above, the tip 154 of the apex 150 extends a point which is a radial distance D from the NRD of the tire, and the lateral edge 164 of the crown-reinforcing (C-R) insert 160 extends to a point which is a radial distance A from the NRD of the tire. As illustrated, the tip 164 of the crown-reinforcing (C-R) insert 160 is closer to the axis of the tire than the tip 154 of the apex 150 (A<D). Both the crown-reinforcing (C-R) insert 160 and apex 150 can be considered to have "end portions" or "tip portions", which are those portions of the structure in the region of the lateral edge 164 or tip 154 of the respective crown-reinforcing (C-R) insert 160 or apex 150. Therefore, the tip portions of the crown-reinforcing (C-R) insert 160 and apex 150 "overlap" radially. As illustrated, the tip portion of the crown-reinforcing (C-R) insert 160 is axially inward of the tip portion of the apex 150, and the crown-reinforcing (C-R) insert 160 is completely separated (laterally spaced-apart) from the apex 150 by the ply 146. The insert 160 is also partially separated (laterally spaced-apart) from the apex by the belt 132. It is within the scope of the invention that the tip portion of the crown-reinforcing (C-R) insert 160 is axially outward of the tip portion of the apex 150.

It is preferred that the crown-reinforcing (C-R) insert 160 is separated from the apex 150 by "something"—in this example, by the ply 146—to avoid possible adhesion problems between the crown-reinforcing (C-R) insert 160 and the apex 150. (The "something" separating the two components 150 and 160 could be a distinct separating element, such as a thermoplastic ribbon/layer.) It is also within the scope of the invention that a single, dual-compounded element constituting both the crown-reinforcing (C-R) insert 160 and the apex 150 could be used. The dual compounding of such a single C-R/apex element (apexes formed integrally with the C-R insert) addresses the general need for a harder rubber is in the lower sidewall region and a softer rubber in the tread region (to avoid overheating).

In the illustrated embodiment of the invention, there are three plies and two belts (all of which are "reinforcing layers"), in the following order: ply 142, ply 144, ply 146, belt 132, belt 134, as described hereinabove, and the crown-reinforcing (C-R) insert 160 is disposed between the ply 144 and the ply 146. It is however within the scope of the invention that the crown-reinforcing (C-R) insert 160 can be disposed interior to the ply 142, or between the plies 142 and 144, or between the ply 146 and the belt 132, or between any two adjacent layers of the sequence of reinforcing layers.

Suitable materials for the various tire components have been described hereinabove. A number of dimensions have been mentioned above. In an exemplary tire, the following dimensions are applicable, and are expressed in centimeters (cm):

Inner Diameter of the tire (=NRD), in the range of 35–55 cm, such as 45 cm.

Outer Diameter of the tire, in the range of 45–75 cm, such as 65 cm.

Section Height (SH) in the range of 6–15 cm, such as 11 cm

Section Width (SW), in the range of 7–26 cm, such as 15 cm.

half Section Width (SW/2), in the range of 3.5–13 cm, such as 7.5 cm.

Sidewall Height (H), in the range of 3.5–10 cm, such as 9 cm.

The following percentages for the parameters A–G are "approximate", and are relative to a sidewall height H=9 cm. As used herein, the term "approximate" means +/−10% of the stated percentage.

Distance A, in the range of 3–5 cm, such as 4.0 cm, or 40% of H Distance B, in the range of 4–6 cm such as 4.5 cm, or 50% of H.

Distance C, in the range of 4–7 cm such as 5.5 cm, or 60% of H.

Distance D, in the range of 4–7 cm such as 6.0 cm, or 70% of H.

Distance E, in the range of 5–7 cm such as 6.5 cm, or 72% of H.

Distance F, in the range of 6–9 cm such as 7.0 cm, or 78% of H.

Distance G, in the range of 9–9.5 cm such as 9.3 cm, or 103% of H (Note that the point at G is shown as not being within the sidewall).

The crown-reinforcing (C-R) insert 160 has a thickness T1 at its central portion 162, and tapers in thickness from a maximum thickness T2 at the shoulder portion 118 of the tire, to a thickness T3 at its lateral edge (tip) 164, where its thickness is substantially zero. (Note from the ranges set forth below that T1 may be less than either of T2 or T3.) In an exemplary tire, the following dimensions are applicable, and are expressed in millimeters (mm). The following percentages for the parameters T1–T3 are "approximate", and are relative to either of the Section Height (SH) or Section Width (SW) being 150 mm. As used herein, the term "approximate" means +/−10% of the stated percentage.

thickness T1, in the range of 1–5 mm, such as 3.0 mm, or 2.0% of SW thickness T2, in the range of 1–5 mm, such as 3.0 mm, or 2.0% of SW thickness T3, in the range of 1–2 mm, such as 1.0 mm, or 0.5% of SW It can thus be seen that a key feature of the invention is the crown-reinforcing (C-R) insert 160 which extends from under the tread 120, substantially (at least one-third of the sidewall height) into the sidewall 116 of the tire 100, along with apexes 150 which extend substantially (at least one-third of the sidewall height) into the sidewall 116 of the tire, thereby effecting a substantial "overlap" between end portions of the crown-reinforcing (C-R) insert and the apexes. In the example given above, the overlap is the radial distance D (75%) minus the radial distance A (35%), or approximately one-third of the sidewall height (H). Also, at least one belt 132 extends from under the tread substantially into the sidewall, and the turn-ups of the plies 140 extend quite high into the sidewall. This combination of features yields superior runflat performance.

The invention is particularly useful for motorcycle tires, and for pneumatic tires having an aspect ratio (AR) which is at least 50%, preferably at least 75%, such as such as approximately 1 (100%).

While the invention has been described in combination with embodiments thereof, it is evident that many alternatives, modifications, and variations will be apparent to those skilled in the art in light of the foregoing description and discussion. The present invention is intended to embrace all such alternatives, modifications and variations as fall within the spirit and scope of the appended claims.

What is claimed is:

1. A tire comprising
a tread region, two bead regions and two sidewalls, each sidewall extending between a respective one of the bead regions and the tread region, the tire further comprising a tread in the tread region, a bead in each of the bead regions, a plurality of reinforcing plies and a belt structure comprising at least two belts disposed below the tread in the tread region,
wherein the reinforcing plies are disposed below the belt structure and extend laterally beyond lateral edges of the tread, radially through the sidewalls to the beads, wrap approximately 180 degrees around the beads and turn-up portions of the plies extend radially back up into the sidewalls),
wherein the tire has a two shoulders each of which is located at an upper portion of a sidewall, just below a lateral edge of the tread,
wherein the tire has an equatorial plane which is a plane perpendicular to the tire's axis of rotation and passing through the center of its tread,
wherein the tire has a section height which is a radial distance from a nominal rim diameter of the tire to outer diameter of the tire,
wherein the tire has a section width which is a maximum linear distance parallel to an axis of the tire and between the exterior of its sidewalls,
wherein the sidewalls have a sidewall height which is the radial distance from the nominal rim diameter to the shoulder of the tire,
the belt package comprises at least two belts, a first belt and a second belt, wherein the second belt is disposed radially outward from the first belt, the belts each extend laterally across the tread region and circumferentially around the tire, and have lateral edges,
the tire characterized in that:
the tire has at least two belts, a first belt and a second belt, wherein the second belt is disposed radially outward from the first belt,
the first belt extends beyond the tread region into the sidewall, its lateral edge being disposed at point which is a first radial distance from the nominal rim diameter of the tire,
the second belt extends to approximately the shoulder of the tire, its lateral edge being disposed at point which is a second radial distance from the nominal rim diameter of the tire,
the tire has three reinforcing plies, a first ply, a second ply, and a third ply, wherein the second ply is radially outward from the first ply and the third ply is radially outward from the second ply, and each of the reinforcing plies has a turn-up which extends into the sidewall of the tire, and an end of the turn-up is disposed at a radial distance from the nominal rim diameter of the tire;
the end of the turn-up of the first ply is disposed at point which is a third radial distance from the nominal rim diameter of the tire,
the end of the turn-up of the second ply is disposed at point which is a fourth radial distance from the nominal rim diameter of the tire,
the end of the turn-up of the third ply is disposed at point which is a fifth radial distance from the nominal rim diameter of the tire,
the tire further comprising:
an apex disposed atop each bead, each apex being formed of high-modulus elastomer, generally triangular in cross-section, and extending from the bead into the sidewall toward the tread region, a base of the apex being disposed adjacent the bead and a tip of the apex being disposed distal from the bead at a sixth radial distance from the nominal rim diameter of the tire, and the apex tapers from widest at its base, where its width is substantially equal to the cross-dimension of the bead, to narrowest at its tip, where its width is substantially zero,
a crown-reinforcing insert disposed below the belt structure and extending across the tread region, through the shoulder, into the sidewall of the tire,
wherein the C-R insert has a central portion which is substantially at the EP of the tire, and lateral edges which are located in the sidewalls of the tire and the lateral edges each extend to a point which is a seventh radial distance from the nominal rim diameter of the tire.

2. A tire, according to claim 1, wherein:
the crown-reinforcing insert extends at least 33% of the sidewall height in to the sidewall of the tire.

3. A tire, according to claim 1, wherein:
the crown-reinforcing insert is disposed between the second ply and the third ply.

4. A tire, according to claim 1, wherein:
the crown-reinforcing insert is formed of elastomer having a Shore A hardness of at least 60.

5. A tire, according to claim 1, wherein:
a tip portion of the crown-reinforcing insert radially overlaps a tip portion of the apex.

6. A tire, according to claim 1, wherein:
the ends of at least some of the turn-ups extends a distance of at least one third the height of the sidewall into the sidewall toward the tread region.

7. A tire, according to claim 1, wherein:
the turn-up of the third ply extends nearly to the tip of the apex, the turn-up of the second ply extends slightly beyond the tip of the apex, and the turn-up of the first ply extends farther beyond the tip of the apex.

8. A tire, according to claim 1, wherein:
the apex is formed of elastomer having a Shore A hardness of at least 75.

9. A tire, according to claim 1, wherein:

the seventh radial distance is approximately 35% of the sidewall height, the fifth radial distance is approximately 50% of the sidewall height, the first radial distance is approximately 60% of the sidewall height, the sixth radial distance is approximately 70% of the sidewall height, the fourth radial distance is approximately 73% of the sidewall height, and the third radial distance is approximately 86% of the sidewall height.

10. A tire, according to claim 1, wherein:

the tire has an aspect ratio which is a ratio of the section height to the section width which is at least 50%.

11. A pneumatic tire comprising:

an elastomer crown-reinforcing insert extending laterally across an entire tread region of the tire and extending at least 33% of a sidewall height into the sidewalls of the tire; and apexes extending from beads of the tire at least one-third of he sidewall height, into the sidewalls of the tire, wherein there is a radial overlap between end portions of the crown-reinforcing insert and the apexes, and the apex end portions overlap axially outward of the crown-reinforcing insert end portions; and the apexes are formed integrally with the crown-reinforcing insert.

12. A tire, according to claim 11, wherein:

the end portions of the crown-reinforcing insert are separated from the apexes by a ply or a belt.

13. A tire, according to claim 11, further comprising:

at least one belt extending from the tread region into the sidewalls, and turn-up portions of at least some of a plurality of plies extending at least one-third of the sidewall height, into the sidewall.

14. A tire, according to claim 11, wherein:

the tire of radial ply or bias ply construction.

* * * * *